(12) United States Patent
Ellä et al.

(10) Patent No.: US 10,164,665 B2
(45) Date of Patent: Dec. 25, 2018

(54) HF CIRCUIT AND HF MODULE

(71) Applicant: SNAPTRACK, INC., San Diego, CA (US)

(72) Inventors: Juha Ellä, Halikko (FI); Edgar Schmidhammer, Stein an der Traun (DE)

(73) Assignee: SnapTrack, Inc., San Diego, CA (US)

( * ) Notice: Subject to any disclaimer, the term of this patent is extended or adjusted under 35 U.S.C. 154(b) by 0 days.

(21) Appl. No.: 15/571,784

(22) PCT Filed: Apr. 27, 2016

(86) PCT No.: PCT/EP2016/059421
§ 371 (c)(1),
(2) Date: Nov. 3, 2017

(87) PCT Pub. No.: WO2016/177617
PCT Pub. Date: Nov. 10, 2016

(65) Prior Publication Data
US 2018/0138929 A1 May 17, 2018

(30) Foreign Application Priority Data
May 6, 2015 (DE) .......... 10 2015 107 069

(51) Int. Cl.
| H04B 1/40 | (2015.01) |
| H04B 1/00 | (2006.01) |
| H04B 1/18 | (2006.01) |
| H04L 5/00 | (2006.01) |
| H04B 1/04 | (2006.01) |

(52) U.S. Cl.
CPC .......... *H04B 1/0057* (2013.01); *H04B 1/18* (2013.01); *H04B 1/40* (2013.01); *H04L 5/001* (2013.01); *H04B 2001/0408* (2013.01)

(58) Field of Classification Search
CPC .......... H04B 1/40; H04B 1/006; H04B 1/525; H04B 15/00; H04B 1/0458; H04B 1/44; H04B 1/18; H04B 1/48; H04B 1/0475; H04B 1/3888; H04B 1/58; H04B 2001/0408
USPC .......................................... 455/77
See application file for complete search history.

(56) References Cited

U.S. PATENT DOCUMENTS

| 2014/0328220 A1* | 11/2014 | Khlat | .......... H04B 1/0064 370/278 |
| 2014/0342678 A1* | 11/2014 | Khlat | .......... H04L 5/001 455/78 |

FOREIGN PATENT DOCUMENTS

WO    2015041993 A1    3/2015

OTHER PUBLICATIONS

International Search Report and Written Opinion—PCT/EP2016/059421—ISA/EPO—dated Jul. 7, 2016.

* cited by examiner

*Primary Examiner* — Ajibola Akinyemi
(74) *Attorney, Agent, or Firm* — Patterson & Sheridan, L.L.P.

(57) ABSTRACT

An HF circuit is specified, by means of which carrier aggregation is possible with a simple design. The circuit comprises a duplexer, a further filter, and two phase shifters, and can be used in an HF module of a mobile wireless device.

14 Claims, 13 Drawing Sheets

HF CIRCUIT AND HF MODULE

CROSS-REFERENCE TO RELATED APPLICATIONS

This application is a national stage application under 35 U.S.C. 371 of PCT/EP2016/059421, filed Apr. 27, 2016, which claims the benefit of German Patent Application Serial No. 10 2015 107 069.3, filed on May 6, 2015, both of which are incorporated herein by reference in their entirety.

The invention relates to HF circuits which can be used in front-end circuits, and HF modules in which such circuits are incorporated. Such circuits are particularly suitable for the simultaneous use of HF signals in different frequency bands (carrier aggregation).

U.S. Pat. No. 7,212,789 B2 discloses HF circuits with a tunable duplexer.

The continuing trend towards increasingly small-scale electrical circuits, e.g., for mobile wireless devices, has a disadvantageous effect on the signal quality, as undesirable interactions between different circuit elements increase due to the smaller distances. This problem is exacerbated by the fact that corresponding electrical devices are also to provide ever increasing functions, as a result of which the number of signal paths and/or the number of circuit elements per signal path increases. In addition, the data rates of modern mobile wireless devices are also expected to increase.

It is therefore the aim of the invention to provide HF circuits which enable sufficient signal quality, despite the above-mentioned and, in themselves, contradictory requirements. This aim is achieved by a HF circuit according to claim 1. Dependent claims specify advantageous embodiments.

The HF circuit comprises a first transmission port, a first reception port, a common port, and a third port. The circuit further comprises a first duplexer having a transmission filter connected between the first transmission port and the common port, and a reception filter connected between the first reception port and the common port. The circuit further comprises a third filter connected between the third port and the common port. In addition, the circuit comprises a first phase shifter connected between the common port of the first duplexer and the common port of the HF circuit. In parallel, the HF circuit comprises a second phase shifter connected between the third filter and the common port of the HF circuit. The third filter is a bandpass filter. The HF circuit is provided to simultaneously pass transmission signals via the transmission filter and the third filter or reception signals via the reception filter and the third filter. One, two, three, or all filters, if the circuit comprises further filters in further signal paths, can be tuned in their characteristic frequencies. The characteristic frequencies include the center frequency of a passband and its bandwidth.

Thus, an HF circuit is provided, which essentially comprises three parallel signal path sections, each with a filter. The two filters of the duplexer can be bandpass filters, just like the third filter.

The specified HF circuit allows simultaneous operation in different frequency bands, e.g., as in the case of carrier aggregation (an accumulation of two or more frequency bands). In particular, an operation with interband Rx carrier aggregation or interband Tx carrier aggregation is possible.

The common port is a connection via which one or more antennas can be connected to the HF circuit via an antenna feeder. Transmission signals can be received from one transceiver circuit via one or more transmission ports. Reception signals can be passed on to one transceiver circuit via one or more reception ports.

The third port can also be connected to a transceiver circuit.

In contrast to conventional HF circuits, which, for example, comprise two or more HF switches for interconnecting corresponding HF filters with corresponding signal path sections, the indicated HF circuit allows carrier aggregation also in the case of frequency bands with a relatively short distance. While carrier aggregation with combined transmission in LB (low-band: approx. 650 to 1000 MHz) and MB (mid-band: 1700-2200 MHz), or simultaneously in LB and HB (high-band: frequencies of essentially >2500 MHz), are still relatively easily possible, the indicated HF circuit also allows carrier aggregation of the combinations LB+LB, MB+MB, or MB+HB. That is, simultaneous transmissions of two frequency bands in the LB or MB or combined frequency bands selected from the MB and the HB are possible with good signal quality.

The number of filters for the case in which different LB-LB band pairs or HB–HB band pairs are to be supported is reduced, wherein the flexibility is additionally increased by the tunability of the one filter or the filters.

Particularly, the mobile radio frequency bands 1, 2, 3, 4, 5, 7, 8, 12, 17, 19, 20, 21, 26, or 28 can be considered for carrier aggregation. The mobile radio bands 5, 8, 12, 17, 19, 20, 26, and 28 are assigned to the LB. The mobile radio bands 1, 2, 3, 4, and 21 are assigned to the MB, and the frequency band 7 is assigned to the HB.

It is thereby possible that transmission signals are routed via the transmission filter of the first duplexer, while at the same time further transmission signals are routed via the third filter. It is also possible for reception signals to be routed via the reception filter of the first duplexer, while at the same time further reception signals of a different frequency band are routed via the third filter, which is then correspondingly designed as a reception filter. Since a duplexer allows simultaneous transmission of second HF signals in the opposite direction, transmission of three different HF signals in two different frequency bands is thus possible.

As frequency bands, the individual frequency ranges, which, since the 3GPP cooperation, are combined as mobile radio frequency bands for Tx or Rx operation, may be considered.

The initially mentioned degradation of the signal quality in conventional HF circuits is thereby circumvented by the fact that the number of circuit elements does not necessarily have to increase with increasing functionality. A tunable filter can, in principle, replace two or more HF filters with fixed characteristic frequency values. The trend towards continued miniaturization with additional functionality can therefore be followed. However, individual circuit elements, such as tunable inductive or capacitive elements, which may be more complex to manufacture, and, in addition thereto, control lines and control elements, are necessary.

It is possible that, in addition to the HF filters or as an alternative to tunable HF filters, at least one phase shifter, two phase shifters, or several phase shifters can also be tunable, if the HF circuit comprises several phase shifters. A tunable phase shifter is in this case an HF circuit, which alters the phase of an HF signal as, for example, a function of frequency, and the frequency dependency or the degree of change can be tuned.

It is possible that the HF circuit additionally comprises a second transmission port, a second reception port, and a second duplexer. The duplexer in turn has a transmission filter and a reception filter. The transmission filter of the second duplexer is connected between the second transmission port and the common port. The reception filter of the second duplexer is connected between the second reception port and the common port.

A third phase shifter, which can also be tunable, can be connected between the second duplexer and the common port.

Thus, an HF circuit is provided which essentially has five, parallel-connected signal paths. Two of the signal paths are covered by the first duplexer.

A third signal path section is covered by the third filter, and two signal path sections are covered by the second duplexer.

Transmission signals or reception signals can be transmitted simultaneously or successively via the two duplexers. The first duplexer can cover a first frequency band, while the second duplexer can cover a second frequency band. The respective frequency bands can be selected from the LB, the MB, or the HB. Via the third port and via the third filter, concurrent operation together with the first duplexer or together with the second duplexer is, according to the carrier aggregation, possible. Correspondingly, the transmission or the reception signal frequencies of the third port can also lie in the LB, in the MB, or in the HB.

It is also possible for the HF circuit to provide a further port, e.g., a sixth port, and a sixth filter configured as a bandpass filter. The sixth filter is connected between the sixth port and the common port.

Thus, an HF circuit, with four ports which are interconnected with two duplexers, and with two further ports which are connected to the common port via a respective filter, is indicated.

A carrier aggregation transmission together with one of the two duplexers can take place via the third port and the third filter. Via the sixth port and the sixth filter, another carrier aggregation transmission can, either alternately or simultaneously, take place together with the other duplexer.

Both transmission signals and/or reception signals can be transmitted via the third port as well as via the sixth port.

A phase shifter may also be connected between the sixth filter and the common port. The phase shifter may thereby comprise impedance elements of constant impedance or be tunable, and then comprise circuit elements, e.g., capacitive elements and/or impedance elements, of adjustable impedance.

It is possible that the HF circuit comprises a diplexer with a first filter and a second filter. The first filter of the diplexer is connected between the first duplexer and, on the one hand, the third filter and, on the other, the common port. The second filter of the diplexer is connected to the common port. The first filter and the second filter are selected from a high-pass filter and a low-pass filter. In this case, the diplexer can be configured as a crossover between the first duplexer and, on the one hand, the third filter and, on the other, further filters, e.g., the filters of a second duplexer and a sixth filter. Therefore, the second filter of the diplexer can be connected between the second duplexer and, on the one hand, the sixth filter and, on the other, the common port.

In other words, the first duplexer and the third filter can be connected to the common port via the first filter of the diplexer. The second duplexer and the sixth filter can be connected to the common port via the second filter of the diplexer.

The first filter of the diplexer can thus be a low-pass filter, while the second filter of the duplexer can be a high-pass filter.

Then, it is possible that the first duplexer operates in the LB or in the MB, while the second duplexer and the sixth filter operate in the MB or in the HB.

Depending upon how the filters of the first duplexer or both duplexers, on the one hand, and the phase shifter or shifters, on the other, are specifically realized, an antenna tuner can be dispensed with. An antenna tuner is thereby a circuit which compensates for an unwanted change in the antenna impedance when, for example, the antenna impedance is altered by objects in its environment, such as hands, head, etc. Suitable HF filters and/or phase shifters are presented below.

It is nevertheless possible for the HF circuit to comprise one or several antenna tuners. For example, an antenna tuner may be connected between the diplexer and the common port. Alternatively, it is possible for a first antenna tuner to be connected between the first duplexer and, on the one hand, the third filter and, on the other, the first filter of the diplexer. A second antenna tuner may be connected between the second duplexer and, on the one hand, the sixth filter and, on the other, the second filter of the diplexer.

The antenna tuner in the case of a single antenna tuner, or the antenna tuners in the case of several antenna tuners, can thus be controlled or regulated. For this purpose, a corresponding antenna tuner can have a correspondingly designed sub-circuit for determining the impedance, and can set the impedance via switchable or variably adjustable impedance elements, such as capacitive elements or inductive elements, in an impedance matching network as a further sub-circuit.

In the event that the HF circuit has a dedicated antenna tuner especially provided for this, and a compensation for a change in the antenna impedance is performed directly by an HF filter, the corresponding variable or switchable impedance elements within the HF filter can be adjusted by means of associated control or regulating signals. Thus, a dedicated antenna tuner is not mandatory, but optional.

Analogously to the possible option of an antenna tuner, it is also optionally possible to provide one or more impedance matching circuits between one or more HF filters and the corresponding transceiver-side ports. This is because an impedance matching of a corresponding signal path section at input or output impedances, e.g., of a reception or a transmission amplifier, is also possible by means of an advantageously selected filter topology.

It is therefore possible for the HF circuit to have three impedance matching circuits. A first impedance matching circuit is possible between the first transmission port and the transmission filter of the first duplexer. A second impedance matching circuit is possible between the first reception port and the reception filter of the first duplexer. A third impedance matching circuit is possible between the third port and the third filter.

Each of the impedance matching circuits may, in turn, comprise a circuit of impedance elements of constant impedance or a circuit with tunable impedance elements.

It is therefore possible that at least one impedance matching circuit or all impedance matching circuits or individual impedance matching circuits can be tuned.

The degree of integration of the HF circuit can be further enhanced by the HF circuit comprising a transmission amplifier, a reception amplifier, and a third amplifier. The transmission amplifier is then connected between the first transmission port and the common port. The reception amplifier is connected between the first reception port and the common port. The third amplifier is connected between the third port and the common port.

The HF filters are preferably located between the amplifiers in their signal path section and the common port.

It is possible that at least one amplifier, a plurality of amplifiers, or all amplifiers are tunable, i.e., signals of different frequencies can be processed. Thus, a tunable amplifier can replace, for example, two or three amplifiers specifically provided because of their frequency band, e.g., selected from LB, MB, or HB.

The above-mentioned advantageous filter topology, which can render superfluous the existence of an antenna tuner and/or an impedance matching circuit in the corresponding signal path section, comprises serial capacitive elements in the signal path section, an inductive element connected in parallel therewith, and parallel paths which connect the corresponding signal path to ground.

It is therefore possible for the HF circuit to comprise a filter whose filter topology has a parallel inductive element, three serial capacitive elements, and four parallel paths. Each of the four parallel paths has a parallel circuit with a capacitive element and an inductive element.

It is possible that such a filter also comprises four or five serial capacitive elements. The fourth serial capacitive element can be arranged on the input side on the signal path, and the fifth serial capacitive element can be arranged on the output side on the signal path. Then, the three serial capacitive elements are connected in series between the fourth and fifth serial capacitive elements.

An advantageous phase shifter, which may support the HF filter therein in obviating antenna tuners and/or impedance matching circuits, may comprise a series capacitive element, two parallel paths each having an inductive element, and a capacitive element connecting the two parallel paths to ground.

Accordingly, it is possible for the HF circuit to comprise at least one such phase shifter or a plurality of such phase shifters. It is also possible for all phase shifters of the HF circuit to have such a circuit topology.

In order for an HF filter and/or a phase shifter to be frequency-tuned, and thus to render antenna tuners and/or impedance matching circuits superfluous, it is preferred for filters and/or phase shifters to comprise tunable impedance elements. The tunable impedance elements can be tunable inductive elements and, particularly, tunable capacitive elements. It is not necessary for all impedance elements of the filter topology or the topology of the phase shifter to be tunable. However, the more impedance elements that are tunable, the greater the number of degrees of freedom in tuning. This increases, on the one hand, the complexity of the circuit by a large number of control lines and, on the other, the complexity of a corresponding control algorithm and/or regulation algorithm. However, the overall circuit complexity is reduced, compared to HF circuits with a variety of different filters, tuners, impedance matching circuits, diplexer filters, and HF switches.

However, within the scope of the efforts of the inventors, it has been shown that the above-mentioned filter and phase shift topologies already have good intrinsic tunability, and the total number of tunable circuit elements can be relatively low. Thus, it is possible that only two or three of the capacitive elements in parallel paths and one or two capacitive elements in the signal path section are sufficient for allowing good tunability over a wide frequency range.

It is possible for one of the above-described HF circuits to be combined in an HF module such that all circuit elements of the circuit are combined in one component.

It is thus possible to combine all HF filters in a single component. The integration of the phase shifters in this component is also possible. Any antenna tuners and/or impedance matching circuits, or at least the impedance matching networks of the antenna tuners, may also be integrated in the component. An additional increase in the degree of integration, and thus a component reduced in size, can be obtained if, in addition, amplifier elements, such as transmission amplifiers or reception amplifiers, are integrated in the component.

The module can thereby comprise one or more substrates and a carrier substrate with one or more dielectric layers and metallization layers arranged in-between. In particular, it is possible for semiconductor substrates to be integrated in a multilayer substrate.

In particular, the following frequency band pairs can be used together:

LB and LB: 5 and 12, 5 and 17;
LB and MB: 3 and 5, 1 and 5, 3 and 20, 1 and 19, 3 and 8, 4 and 12, 4 and 17, 3 and 26, 3 and 19, 19 and 21;
MB and MB: 1 and 21, 2 and 4;
MB and HB: 1 and 7, 3 and 7, 4 and 7;
LB and HB: 7 and 20, 7 and 28, 5 and 7.

The more broadband-wise an antenna can work, the more easily it can be used in a mobile wireless device. However, since the bandwidth of an antenna usually decreases with a reduction in size of the antenna, a compromise must be found between as high a bandwidth as possible and a small component size. The ability of the above filter topology or phase shift topology to alter the antenna impedance seen from the transceiver allows for avoiding a compromise: Even a small-sized and narrow-banded antenna can be operated by appropriate impedance corrections, which can be performed by the filter itself, in such a way that a good signal transmission is always possible.

It is therefore possible to connect the HF circuit to an antenna having a bandwidth of about 25 to 30 MHz. An antenna with a bandwidth of 25 to 30 MHz is suitable, e.g., as an antenna for an additional reception path.

The basic structure of an HF circuit, the principles of its operation, and typical, but non-limiting exemplary embodiments are explained in more detail below with reference to schematic figures.

Shown are.

Figure 1:
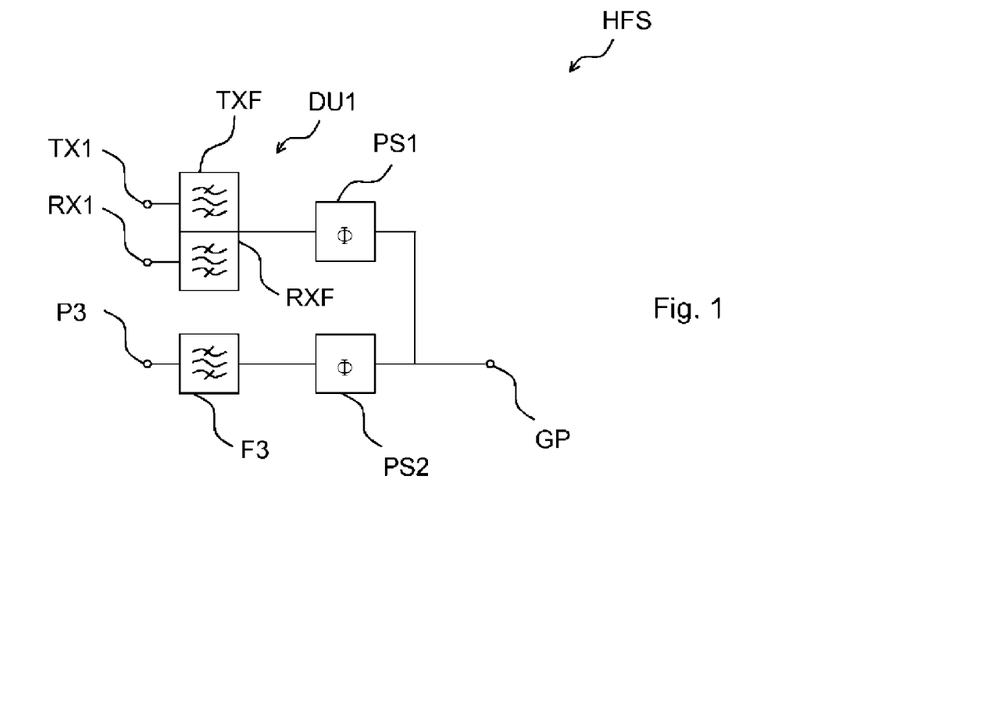
FIG. 1: a simple exemplary embodiment of the HF circuit with a duplexer, a third filter, and two phase shifters.

FIG. 1 shows a basic form of the HF circuit HFS. The circuit comprises a first duplexer DU1 and a third filter F3. It also comprises a first phase shifter PS1 and a second phase shifter PS2. The first duplexer is connected between a first transmission port TX1 and, on the one hand, a first reception port RX1, and, on the other, the common port GP. The third filter F3 is connected between the third port P3 and the common port GP. The first phase shifter PS1 is connected between the first duplexer DU1 and the common port GP. The second phase shifter PS2 is connected between the third filter F3 and the common port GP.

The first duplexer DU1 comprises a transmission filter TXF and a reception filter RXF. The transmission filter TXF is connected to the first transmission port TX1. The reception filter RXF is connected to the first reception port RX1.

The signal path thus branches on the common port or shortly after the common port GP into two subsegments, of which one comprises the first duplexer DU1 and the second the third filter F3. Operation with carrier aggregation is also possible in the case of problematic band-pair combinations, since the two phase shifters eliminate or reflect unwanted signals, which, for example, may extend from the first transmission port TX1 to the third filter F3.

Figure 2:
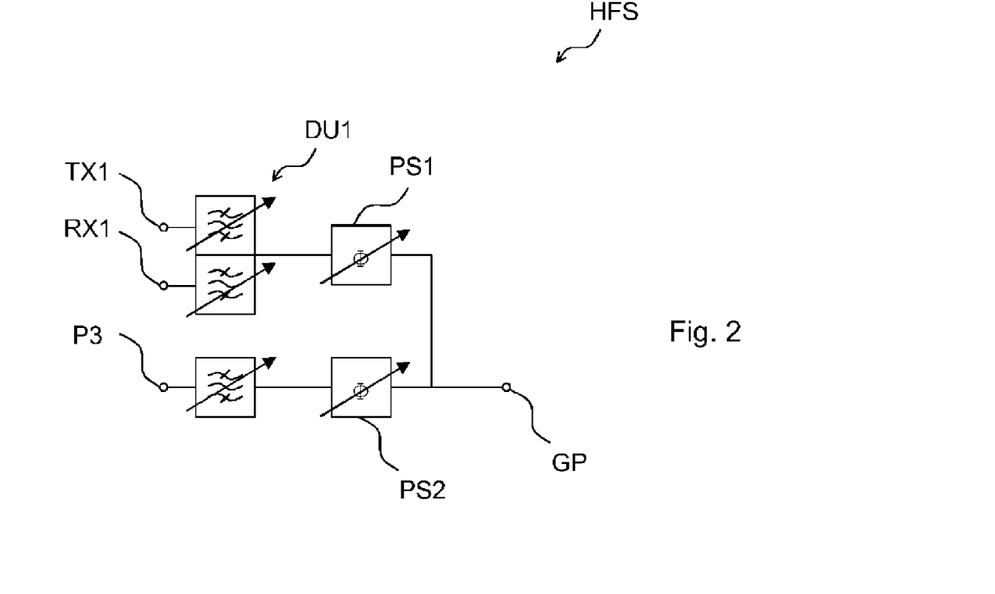
FIG. 2: an embodiment of the circuit shown in FIG. 1, in which filters and phase shifters are tunable.

FIG. 2 shows an embodiment of the HF circuit HFS, which in its topology essentially corresponds to the circuit shown in FIG. 1. However, the filters and phase shifters are tunable (represented by the oblique arrow).

It is possible that no single circuit element of the HF circuit is tunable. However, it is also possible for essentially every functional block (filter, phase shifter, . . . ) to be tunable. In addition, it is also possible for only individual functional blocks to be tunable, whereas other blocks (e.g., impedance matching circuits; cf. FIG. 8) comprise impedance elements of constant impedance and are therefore not tunable.

Figure 3:
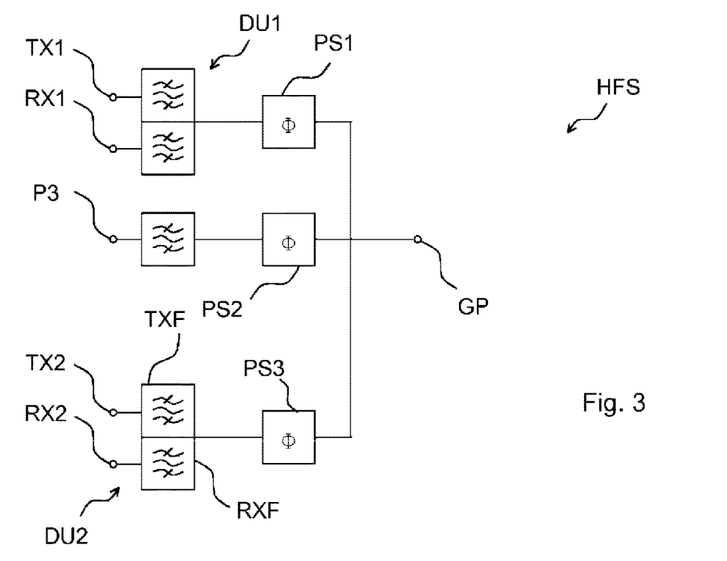
FIG. 3: an embodiment of the HF circuit with a second duplexer.

FIG. 3 shows an embodiment of the HF circuit HFS, which comprises a second duplexer DU2, with a transmission filter TXF and a reception filter RXF, and a third phase shifter PS3. The transmission filter TXF of the second duplexer is thereby connected between the second transmission port TX2 and the third phase shifter PS3. The reception filter RXF of the second duplexer DU2 is connected between the second reception port RX2 and the third phase shifter PS3. The third phase shifter PS3 is connected between the second duplexer and the common port GP.

The signal path which leads from the third port P3 via the third filter and the second phase shifter PS2 to the common port GP can be used for carrier aggregation operation, both together with the first duplexer DU1 and with the second duplexer DU2.

Figure 4:
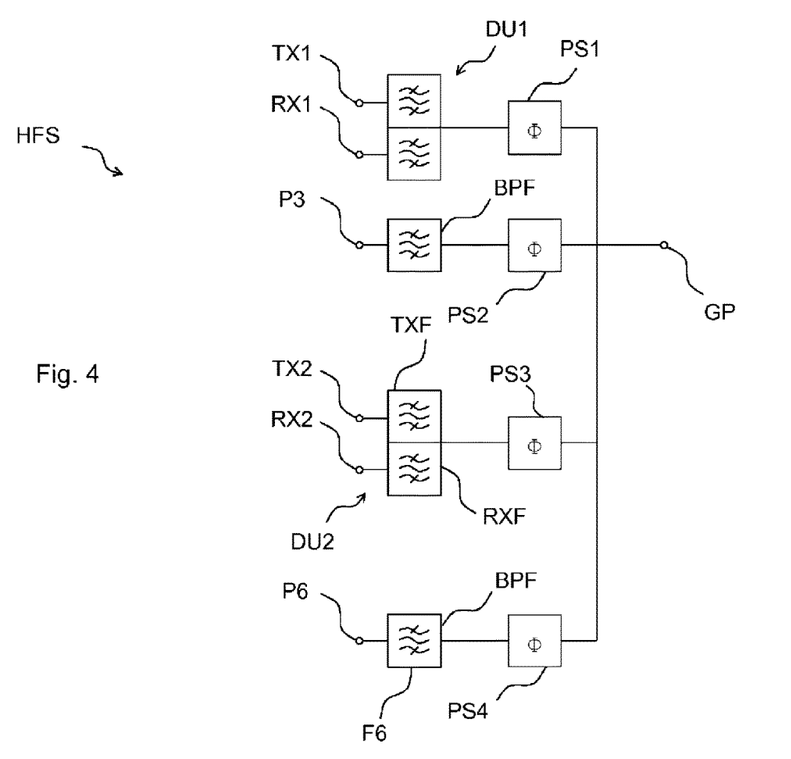
FIG. 4: an embodiment of the HF circuit with two duplexers and two additional filters.

FIG. 4 shows a possible embodiment of the HF circuit HFS, in which, in comparison to the circuit shown in FIG. 3, a further signal path section is added. This leads from the sixth port P6, via an HF filter implemented as a bandpass filter BPF and a fourth phase shifter PS4, to the common port GP. Thus, the HF circuit thus comprises two duplexers and two additional signal path sections, each of which can be used for carrier aggregation operation with one of the duplexers.

Figure 5:
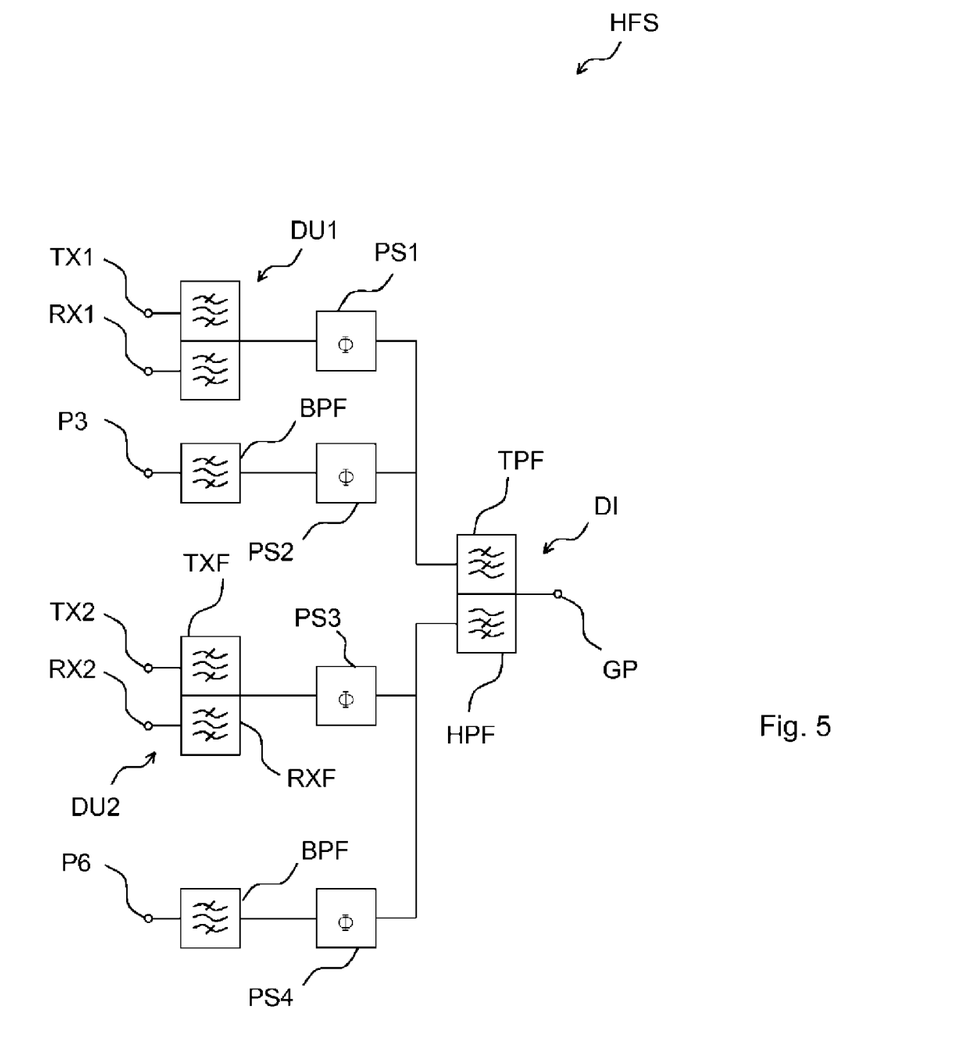
FIG. 5: an embodiment of the HF circuit with a diplexer.

FIG. 5 shows an embodiment of the HF circuit HFS in which two signal path branches are connected via a diplexer DI to the common port GP. The first branch comprises the signal path sections with the first duplexer DU1 and the first phase shifter PS1, on the one hand, and with the bandpass filter BPF arranged between the third port P3 and the second phase shifter PS2 and the second phase shifter PS2, on the other. The second branch comprises, on the one hand, the second duplexer DU2 and the associated third phase shifter PS3 and, on the other, the bandpass filter BPF connected to the sixth port and the fourth phase shifter PS4.

The diplexer DI comprises a low-pass filter TPF and a high-pass filter HPF. The low-pass filter TPF can propagate HF signals in the LB and/or in the MB between the first transmission port TX1, the first reception port RX1, and the third port P3, on the one hand, and the common port GP, on the other. Signals from the MB and the HB can propagate via the second transmission port TX2, the second reception port RX2 and/or the sixth port P6, on the one hand, and the common port GP.

The diplexer thus represents a crossover which assigns corresponding frequency ranges to the associated signal path sections.

The existence of the diplexer is not bound to the existence of the second duplexer or the existence of the bandpass filter connected to the sixth port P6. A corresponding HF circuit HFS with only one duplexer, the third port P3 and the sixth port P6, and a diplexer is also possible, as is a circuit HFS with two duplexers and only one additional signal path, e.g., between the third port P3 and the common port GP.

Figure 6:
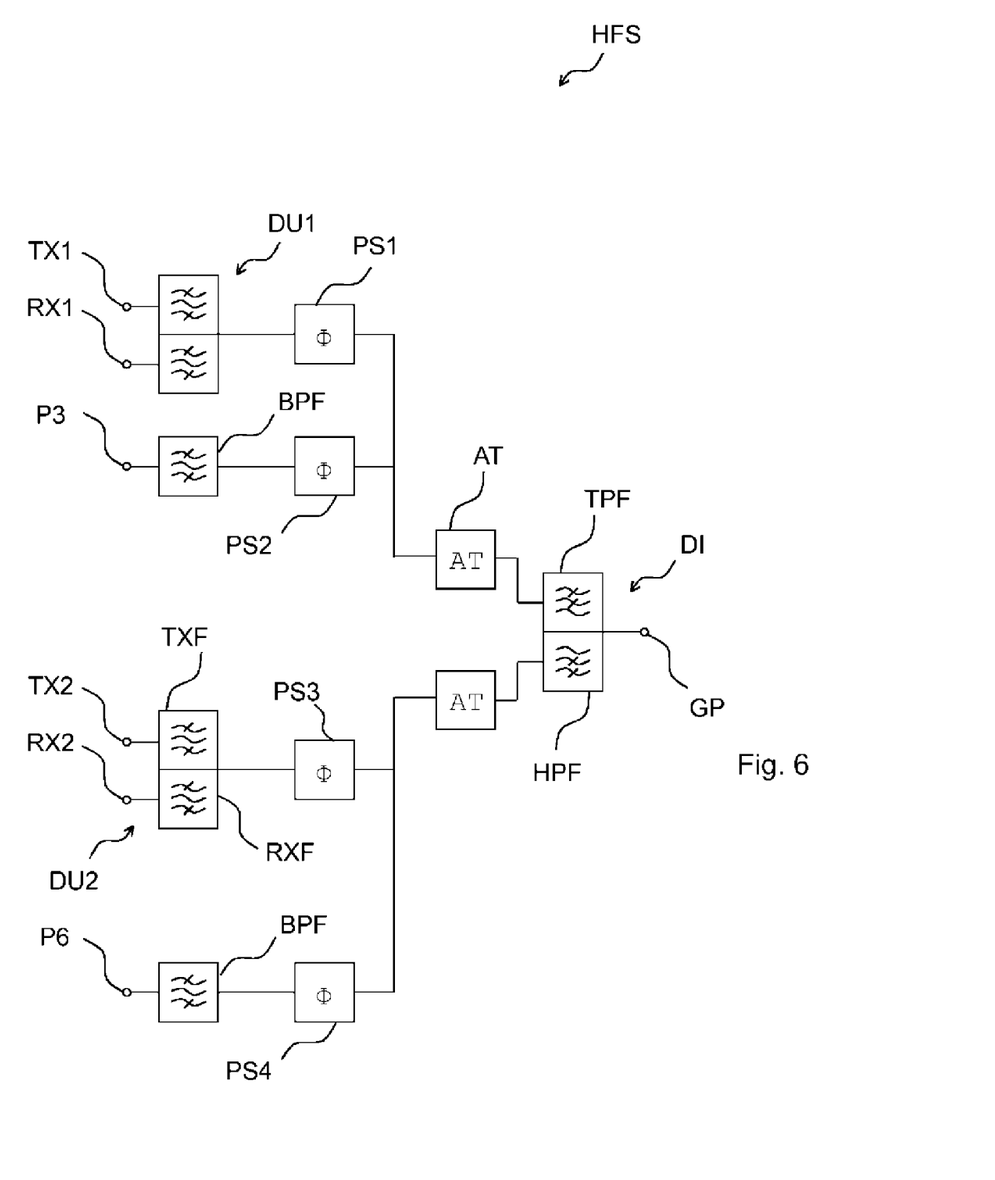
FIG. 6: an embodiment of the HF circuit with two antenna tuners.

FIG. 6 shows how a possible antenna tuner AT can be interconnected within the HF circuit HFS. An antenna tuner is preferably connected between the phase shifters and one of the filters of the diplexer DI. However, it is also possible to interconnect a single antenna tuner between the common port GP and the diplexer DI. Then, not every branch requires its own antenna tuner AT on the corresponding filter of the diplexer DI.

Figure 7:
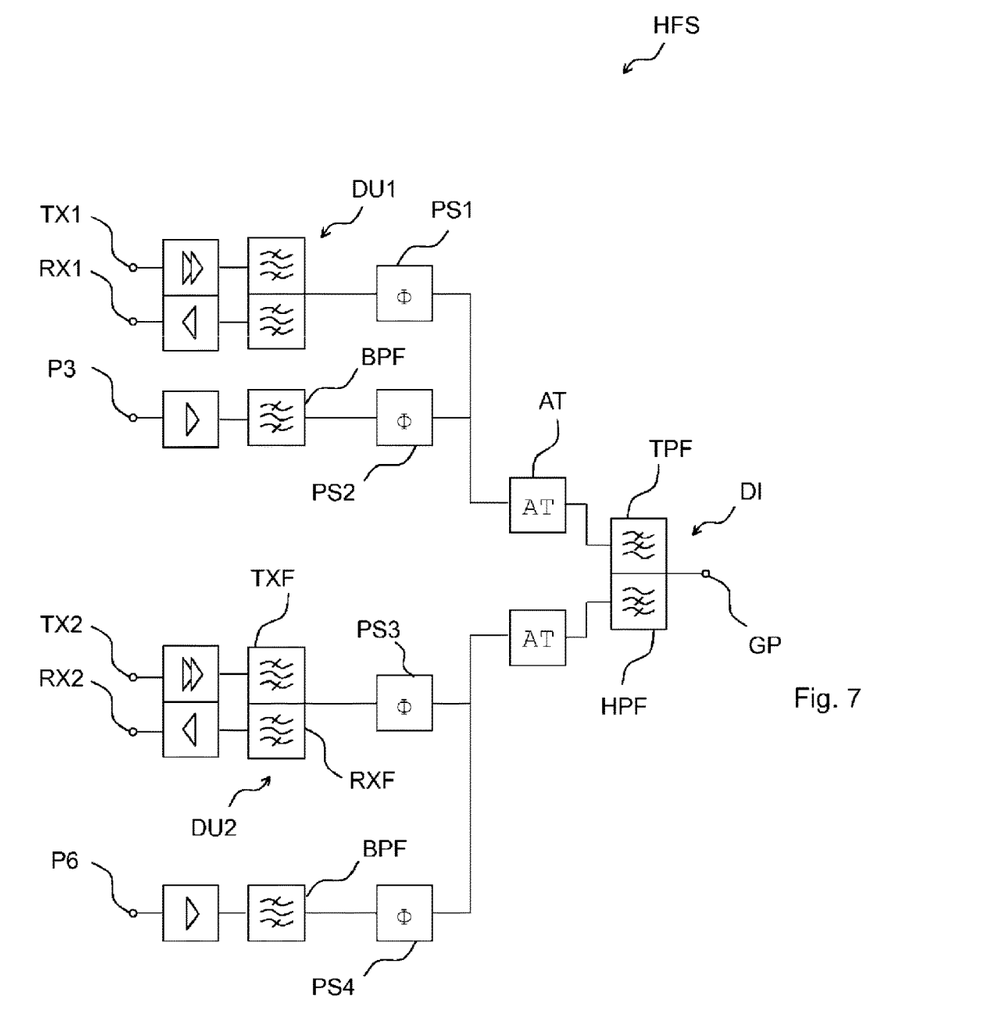
FIG. 7: an embodiment of the HF circuit, in which amplifiers are provided between the ports and the filters.

FIG. 7 shows how additional amplifiers can be interconnected within the HF circuit: A reception filter may be provided with a reception amplifier, e.g., a low-noise amplifier. A transmission filter may be connected to a transmission amplifier, e.g., a power amplifier.

Figure 8:
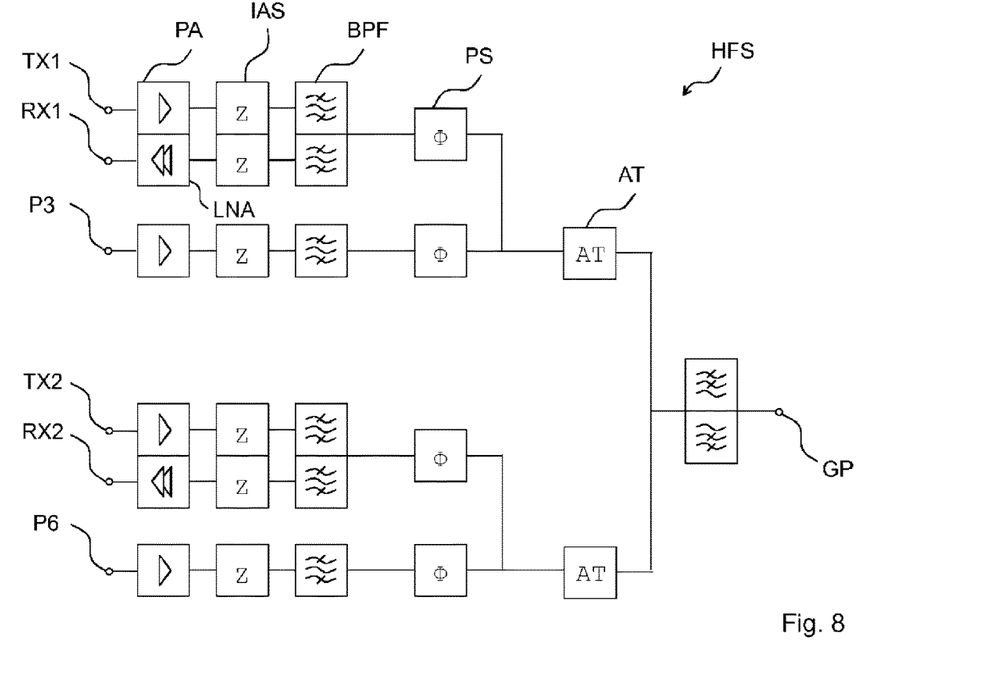
FIG. 8: an embodiment of the HF circuit in which impedance matching circuits are provided between the amplifiers and the filters.

FIG. 8 shows how an impedance matching circuit IAS can be connected between amplifiers and filters in order to carry out an impedance matching between a usually very low output impedance of a power amplifier or a usually very high impedance as an input impedance of a reception amplifier, on the one hand, and the HF filter, on the other.

Figure 9:
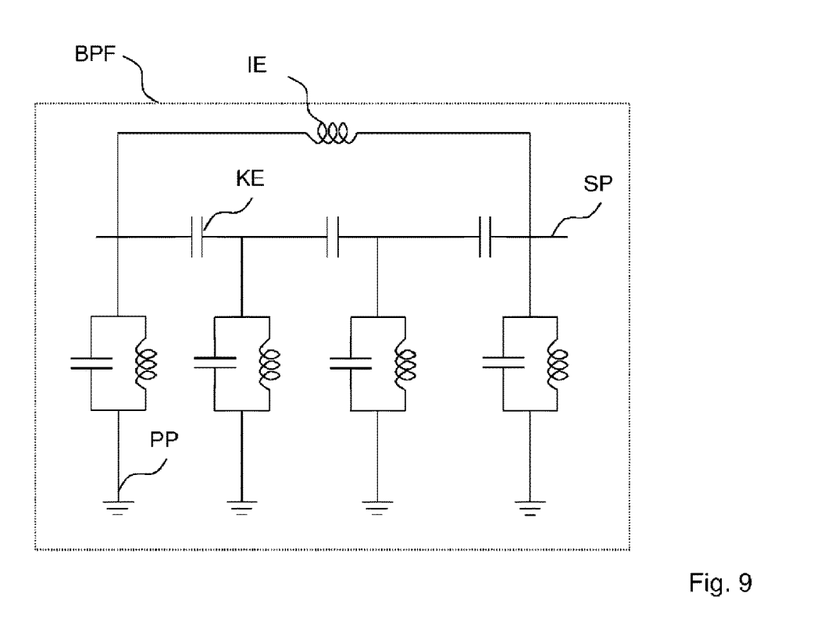
FIG. 9: an embodiment of a bandpass filter.

FIG. 9 shows a possible, but preferred circuit topology of the bandpass filters BPF. For example, a bandpass filter BPF comprises a signal path SP in which, for example, three capacitive elements can be connected in series. An impedance element IE is provided parallel to the serial connection of the capacitive elements. The two connections of the bandpass filter BPF and two nodes between the three capacitive elements are each connected to ground via a parallel path PP. A parallel path comprises a parallel connection of a capacitive element and an inductive element.

Figure 10:
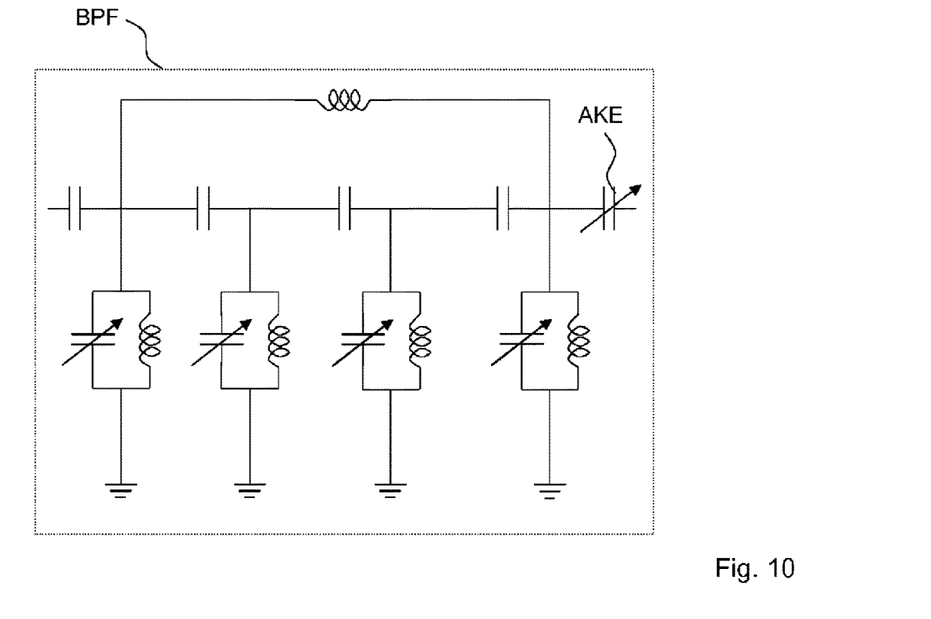
FIG. 10: an embodiment of a tunable bandpass filter.

FIG. 10 shows an embodiment of the bandpass filter BPF, with a further capacitive element being connected in each case on the input and output sides. The capacitive element in the signal path, which is arranged on the side of the bandpass filter connected to the common port, is a tunable capacitive element AKE. The capacitive elements in the parallel resonant circuits in the parallel paths are also tunable.

The bandpass filter BPF can thus be tuned in such a way that its characteristic frequencies, the center frequency, and the bandwidth can be adjusted for various frequency bands relevant in mobile radio operation.

Figure 11:
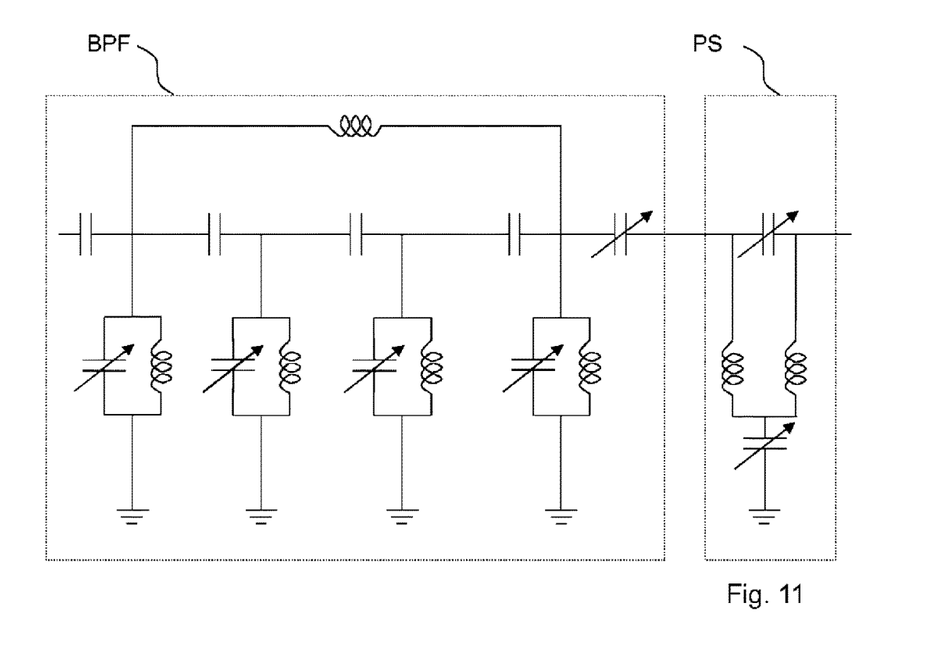
FIG. 11: a serial connection of a bandpass filter with a phase shifter.

FIG. 11 shows by way of example how a bandpass filter BPF can be connected to a phase shifter PS, and which circuit topology can have a phase shifter PS. Thus, the phase shifter PS is connected between the bandpass filter BPF and the common port GP. The phase shifter comprises a capacitive element in the signal path and two parallel paths to ground. An inductive element is connected in each parallel path to ground. On the ground side, the two inductive elements are then connected to ground via a further capacitive element in the parallel path. The two capacitive elements in the phase shifter PS are designed to be tunable.

Figure 12:
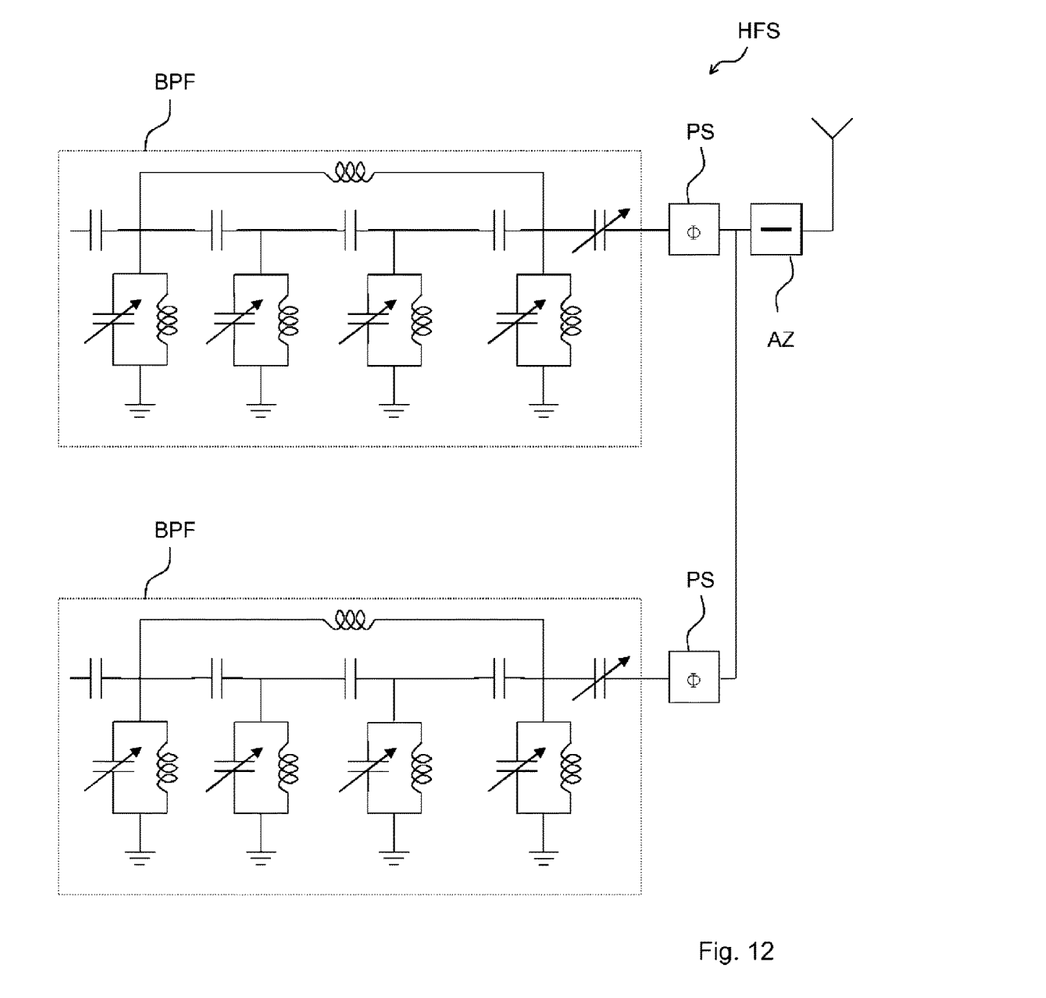
FIG. 12: an HF circuit which masters carrier aggregation and has a simple design.

FIG. 12 illustrates a circuit topology with two tunable bandpass filters BPF and two phase shifters PS, which are connected to an antenna via an antenna feed line AZ. Such an interconnection enables carrier aggregation even in the case of band combinations which hitherto have not been possible with such simple circuitry with conventional front-end circuits.

One of the two bandpass filters of FIG. 12 can be a bandpass filter of the duplexer. The other bandpass filter is the third bandpass filter which connects the third port to the common port—here, between the phase shifters and the antenna feed.

The fact that the simulations shown in the later figures, which are based upon the topology of FIG. 11, represent good results shows that circuit topology itself is well-suited for easily enabling problematic carrier-aggregation band combinations.

Figure 13:
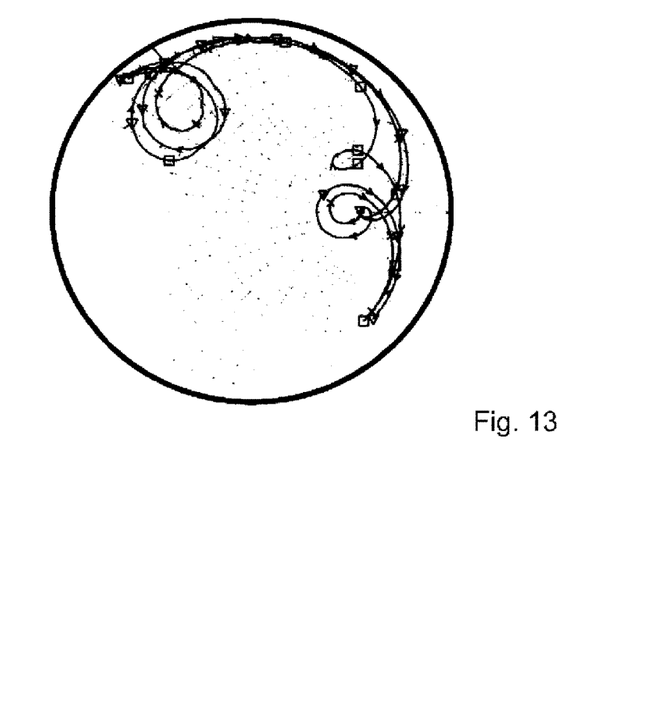
FIG. 13: a Smith chart of an advantageous antenna considered alone.

FIG. 13 shows the frequency-dependent impedance of a narrow-band antenna with a characteristic impedance not equal to 50Ω, as perceived by a front-end circuit under various ambient conditions. In essence, the antenna behaves in a low-impedance and inductive manner, thereby providing a suitable counterpart to the front-end circuit, which the HF circuit can be used for.

Figure 14:
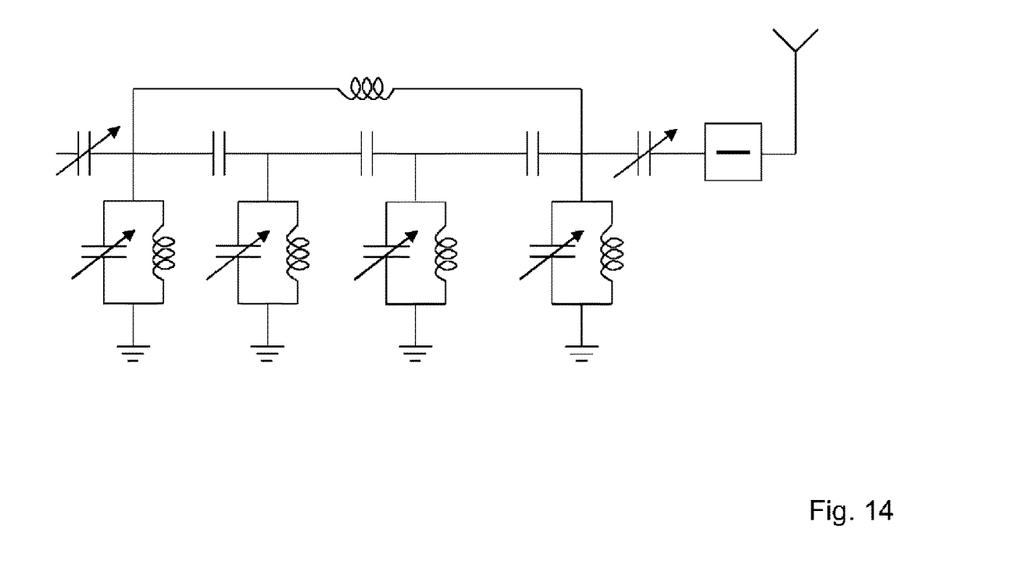
FIG. 14: an embodiment of an HF filter which can correct an antenna mismatch.

FIG. 14 shows a circuit topology that is well-suited for performing antenna tuning.

Figure 15:
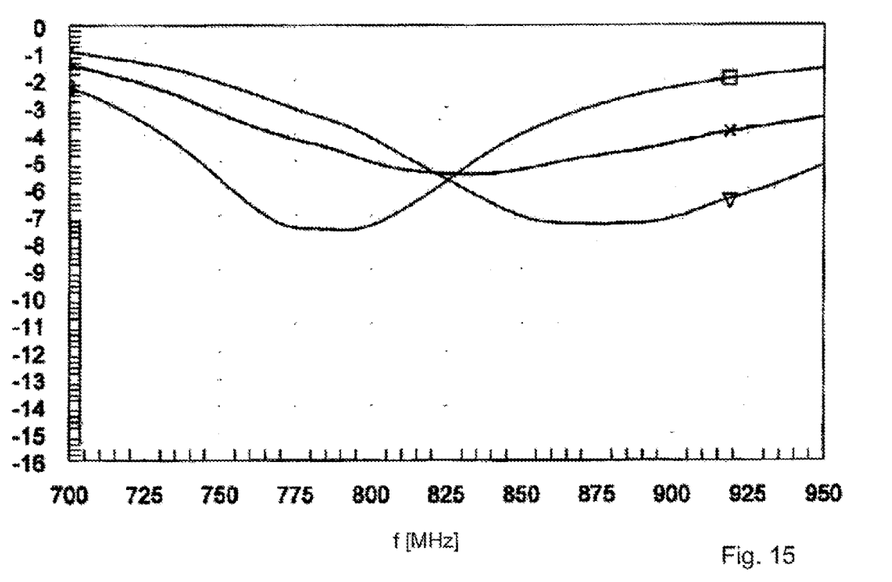
FIG. 15: frequency-dependent impedance matching of an antenna in different environments.

FIG. 15 shows the tuning of the antenna belonging to FIG. 13 for the three different ambient conditions. It is found that the operating frequency of the antenna and its reflectivity are strongly dependent upon the arrangement of objects in their surroundings.

Figure 16:
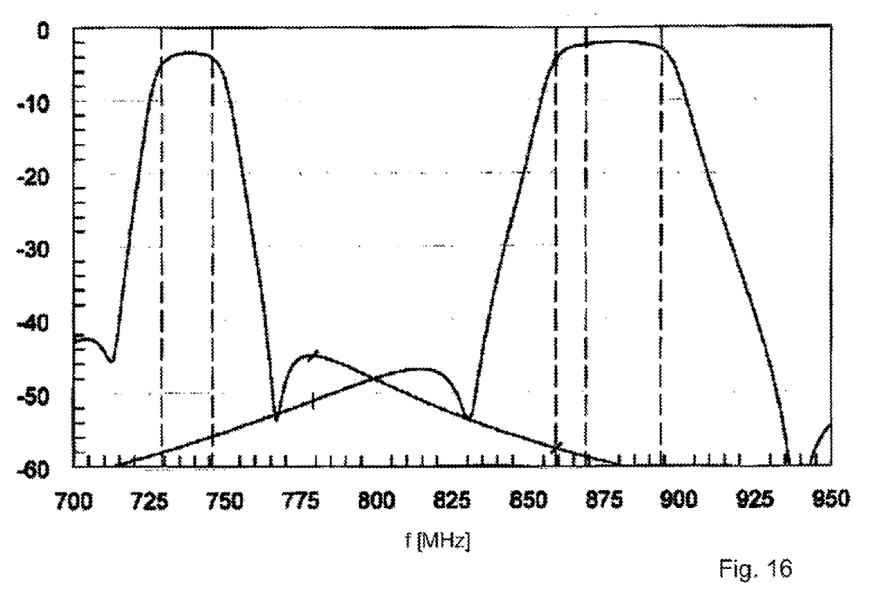
FIG. 16: insertion attenuations of a reference circuit with two bandpass filters.

FIG. 16 shows insertion losses, which are obtained only by tunable filters without further functional blocks and therefore serve as a reference.

Figure 17:
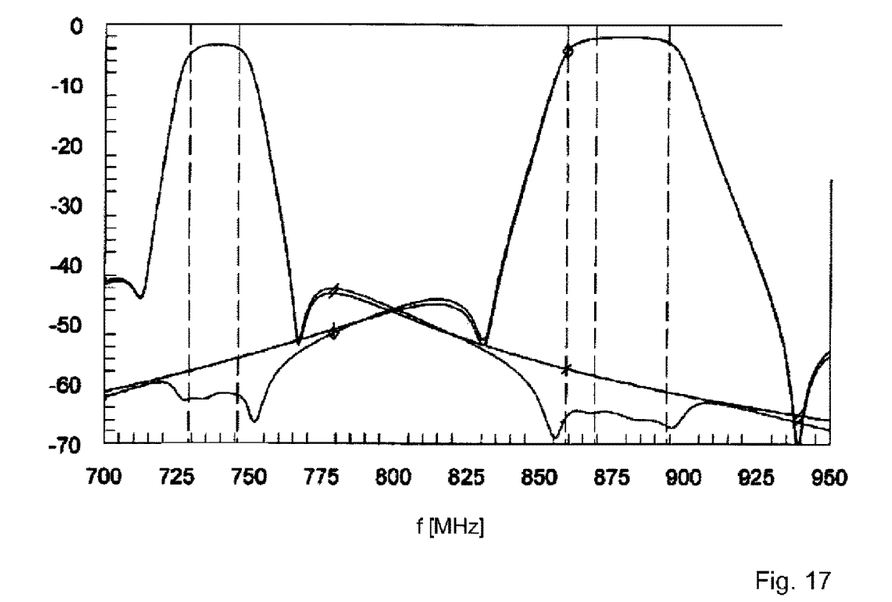
FIG. 17: insertion attenuations of an HF circuit with phase shifters compared to the reference circuit.

FIG. 17 shows, in addition to the reference curves of FIG. 16, the insertion attenuations of HF circuits, in which the HF filters are each connected with a phase shifter. It can be clearly seen that the phase shifter does not substantially impair the transmission characteristics of the filters.

Figure 18:
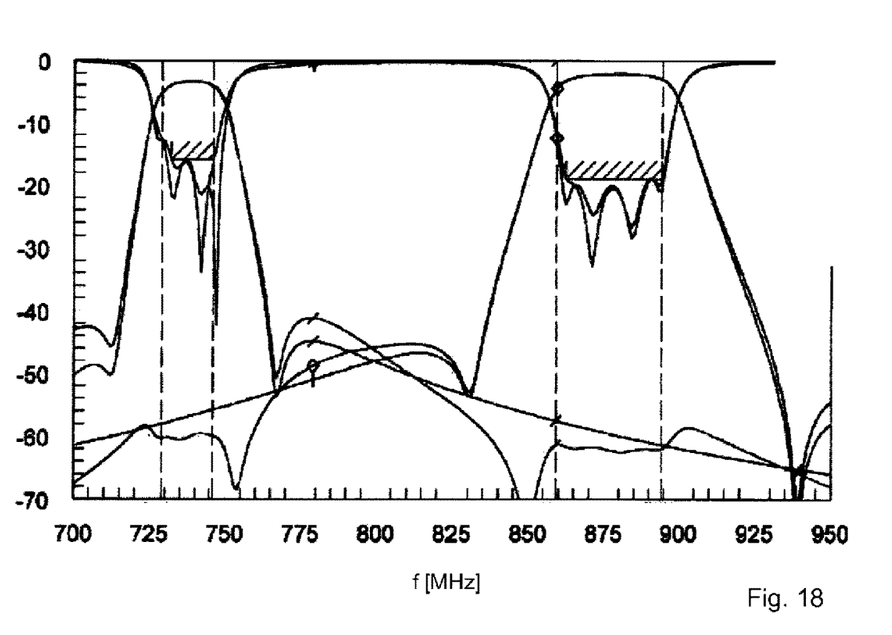
FIG. 18: insertion attenuations of an HF circuit connected to an antenna mis-tuned due to external influences.

Finally, FIG. 18 shows the pass-through characteristic for a full-featured front-end circuit, which here consists of a tunable filter in combination with a tunable phase shifter, via which the filter is connected to an antenna. The antenna is simulated in a specific, typical spatial environment.

Figure 19:
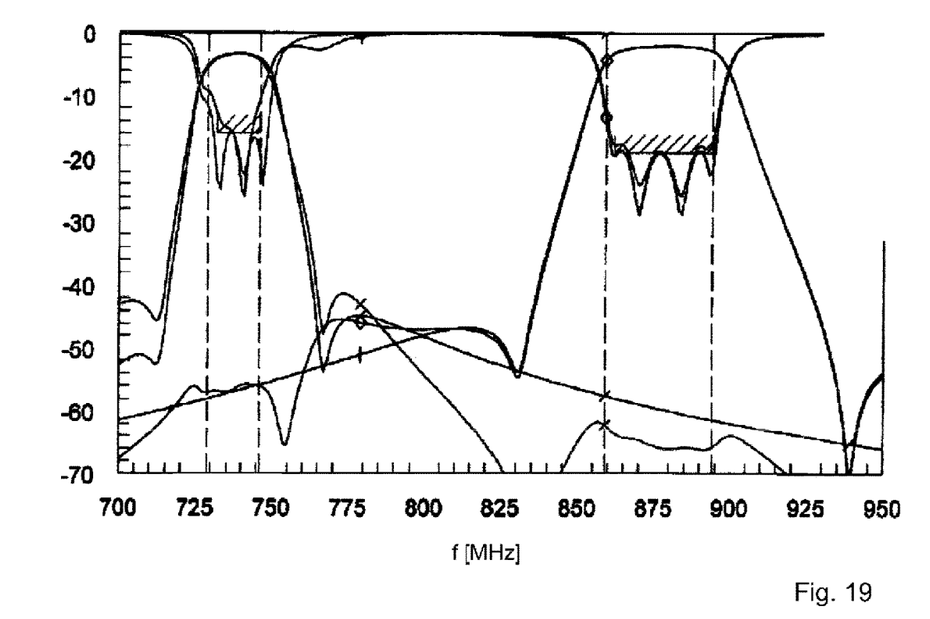
FIG. 19: the insertion attenuations of a circuit according to FIG. 18, with varied external influences.

The same applies to FIG. 19, the curves of which are based upon a second, varied spatial environment of the antenna.

FIG. 20 again shows through-pass characteristics of the circuit, in which the antenna is arranged in a third possible spatial environment.

Figure 20:
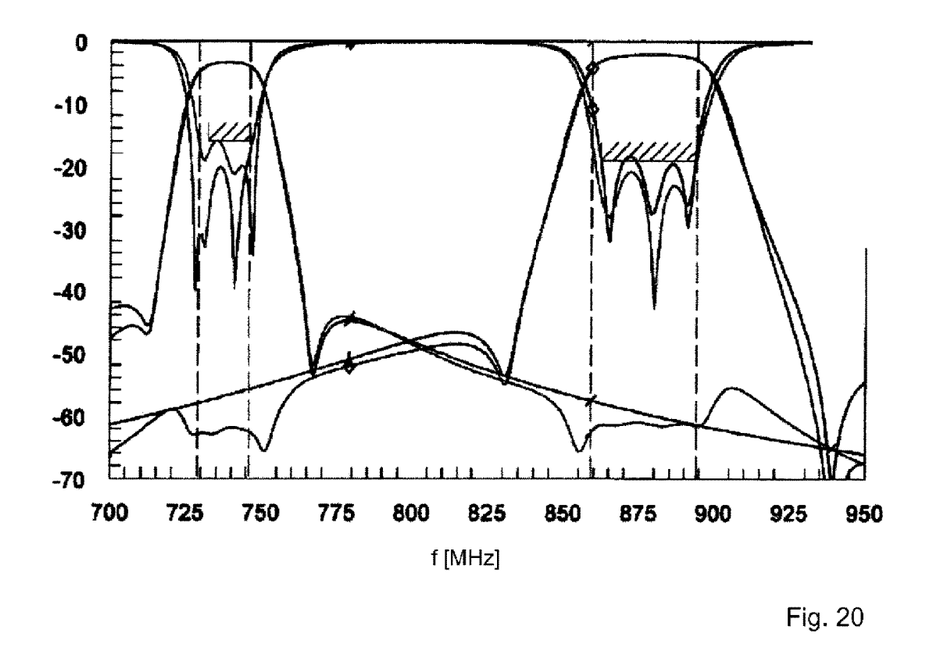
FIG. 20: insertion attenuations of the circuit according to FIGS. 18 and 19, with further varied external influences.

FIGS. 18, 19, and 20 show that, in spite of varied external surroundings of the antenna, a good antenna tuning is possible in each case, without dedicated antenna tuners.

Figure 21:
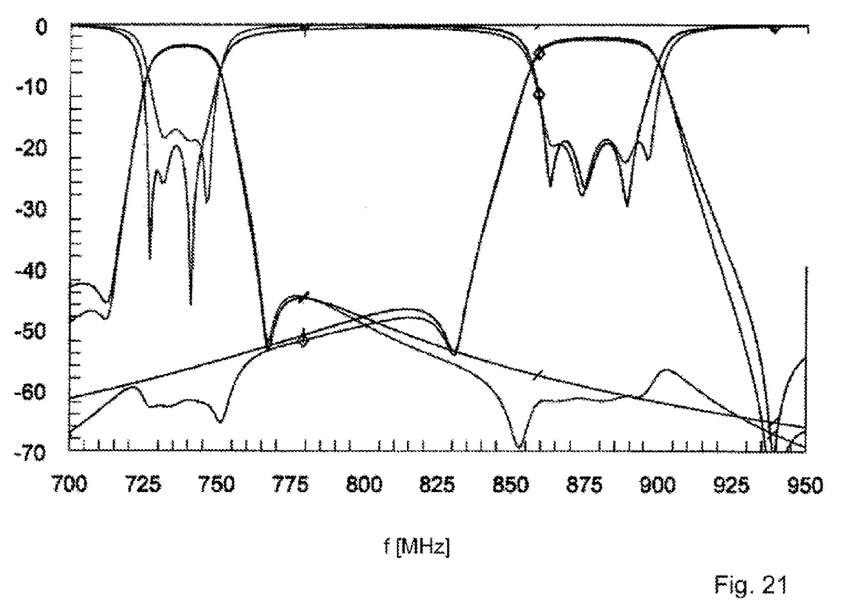
FIG. 21: insertion attenuations of an HF circuit with two bandpass filters and, in each case, one phase shifter.

FIG. 21 shows the transmission characteristic for the spatial environment, on which the transmission characteristic of FIG. 19 is also based. The characteristics of FIG. 21 are additionally based upon phase shifters, as shown, for example, in FIG. 11.

Figure 22:
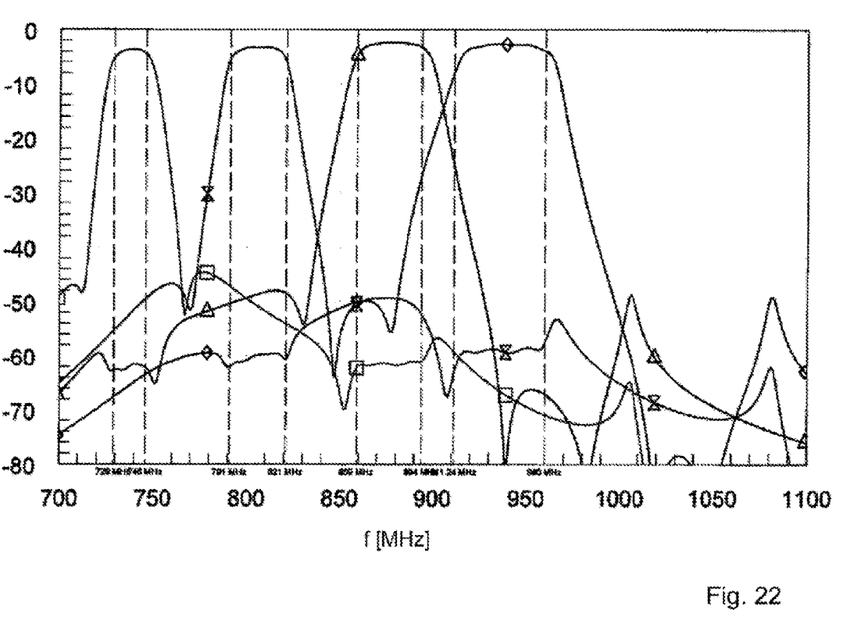
FIG. 22: insertion attenuations of an HF circuit with tunable filters and tunable phase shifters tuned to different frequency bands in the event of simultaneous activity in different frequency bands.

FIG. 22 shows that the tunability with respect to the frequencies of the HF circuit in simultaneous operation in two different frequency bands (in this case, LB band 5/26 and band 8) functions well.

LIST OF REFERENCE SIGNS

AKE: Adjustable capacitive element
AT: Antenna tuner
AZ: Antenna feeder
BPF: Bandpass filter
DI: Diplexer
DU1: First duplexer
DU2: Second duplexer
F3: Third filter
F6: Sixth filter
GP: Common port
HFS: HF circuit
HPF: High-pass filter of diplexer
IE: Inductive element
KE: Capacitive element
LNA: Low noise amplifier, reception amplifier
P3: Third port
P6: Sixth port
PA: Power amplifier, transmission amplifier
PP: Parallel path
PS: Phase shifter
PS1: First phase shifter
PS2: Second phase shifter
PS3: Third phase shifter
PS4: Fourth phase shifter
RX1: First reception port
RX2: Second reception port
RXF: Reception filter
SP: Signal path
TPF: Low-pass filter of diplexer
TX1: First transmission port
TX2: Second transmission port
TXF: Transmission filter

The invention claimed is:

1. A radio frequency (RF) circuit comprising
a first port, a first reception port, a common port, and a third port,
a first duplexer comprising a transmission filter connected between the first transmission port and the common port, and a reception filter connected between the first reception port and the common port,
a third filter connected between the third port and the common port, a first phase shifter connected between the common port of the first duplexer and the common port of the RF circuit, and a second phase shifter connected between the third filter and the common port of the RF circuit, wherein the third filter is a bandpass filter, wherein the RF circuit is provided to simultaneously transmit signals via the transmission filter and the third filter, or receive signals via the reception filter and the third filter, wherein at least one of the transmission filter, the reception filter, or the third filter is tunable, and wherein at least one of the transmission filter, the reception filter, or the third filter comprises a filter topology comprising a parallel inductive element, three serial capacitive elements, and four parallel paths, each of the parallel paths having a parallel circuit with a capacitive element and an inductive element.

2. The RF circuit according to claim 1, wherein at least one of the first phase shifter or the second phase shifter is tunable.

3. The RF circuit according to one of the preceding claims, further comprising a second transmission port, a second reception port, and a second duplexer having a transmission filter connected between the second transmission port and the common port, and a reception filter, which is connected between the second reception port and the common port.

4. The RF circuit according to one of the preceding claims, further comprising a sixth port and a sixth filter configured as a bandpass filter connected between the sixth port and the common port.

5. The RF circuit according to one of the preceding claims, further comprising a diplexer having a first filter and a second filter, wherein the first filter of the diplexer is connected between the first duplexer and the common port and connected between the third filter and the common port, wherein the second filter of the diplexer is connected to the common port, and wherein the first filter and the second filter are selected from high-pass filters and low-pass filters.

6. The RF circuit according to one of the preceding claims, further comprising an antenna tuner connected between the first duplexer and the common port.

7. The RF circuit according to one of the preceding claims, further comprising a first impedance matching circuit, a second impedance matching circuit, and a third impedance matching circuit, wherein the first impedance matching circuit is connected between the first transmission port and the transmission filter of the first duplexer, wherein the second impedance matching circuit is connected between the first reception port and the reception filter of the first duplexer, and wherein the third impedance matching circuit is connected between the third port and the third filter.

8. The RF circuit according to the preceding claim, wherein at least one of the first impedance matching circuit, the second impedance matching circuit, or the third impedance matching circuit is tunable.

9. The RF circuit according to one of the preceding claims, further comprising a transmission amplifier, a reception amplifier, and a third amplifier, wherein the transmission amplifier is connected between the first transmission port and the common port, wherein the reception amplifier is connected between the first reception port and the common port, and wherein the third amplifier is connected between the third port and the common port.

10. The RF circuit according to the preceding claim, wherein at least one of the transmission amplifier, the reception amplifier, or the third amplifier is tunable.

11. The RF circuit according to claim 1, wherein the filter comprises four or five serial capacitive elements.

12. The RF circuit according to one of claims 1-10 and 11, wherein at least one phase shifter or all phase shifters each comprise a serial capacitive element, two parallel paths, each having an inductive element, and a capacitive element which connects the two parallel paths to ground.

13. The RF circuit according to one of the two preceding claims, wherein the filter comprises a tunable inductive element or a tunable capacitive element.

14. An RF module which combines all the circuit elements of the RF circuit according to one of claims 1-10 and 11-13 in one component.

* * * * *